United States Patent
Krummel et al.

(10) Patent No.: US 10,536,453 B2
(45) Date of Patent: Jan. 14, 2020

(54) METHOD AND ARRANGEMENT FOR AUTHORIZING AN ACTION ON A SELF-SERVICE SYSTEM

(71) Applicant: Wincor Nixdorf International GmbH, Paderborn (DE)

(72) Inventors: Volker Krummel, Paderborn (DE); Sascha Oberhellmann, Lengerich (DE)

(73) Assignee: Wincor Nixdorf International, GmbH, Paderborn (DE)

( * ) Notice: Subject to any disclaimer, the term of this patent is extended or adjusted under 35 U.S.C. 154(b) by 115 days.

(21) Appl. No.: 15/511,061

(22) PCT Filed: Sep. 10, 2015

(86) PCT No.: PCT/EP2015/070731
§ 371 (c)(1),
(2) Date: May 31, 2017

(87) PCT Pub. No.: WO2016/041843
PCT Pub. Date: Mar. 24, 2016

(65) Prior Publication Data
US 2019/0007396 A1    Jan. 3, 2019

(30) Foreign Application Priority Data
Sep. 15, 2014   (EP) .................................... 14184752

(51) Int. Cl.
*G06F 21/34*   (2013.01)
*H04L 29/06*   (2006.01)
(Continued)

(52) U.S. Cl.
CPC .......... *H04L 63/0853* (2013.01); *G06F 21/34* (2013.01); *G06Q 20/1085* (2013.01);
(Continued)

(58) Field of Classification Search
CPC ....................................................... G06F 21/34
See application file for complete search history.

(56) References Cited

U.S. PATENT DOCUMENTS

| 5,354,974 | A  |    | 10/1994 | Eisenberg |            |
|-----------|----|----|---------|-----------|------------|
| 7,458,510 | B1 | *  | 12/2008 | Zhou      | G06Q 20/18 |
|           |    |    |         |           | 235/379    |

(Continued)

FOREIGN PATENT DOCUMENTS

| DE | 102008053292 A1  | 4/2010  |
| DE | 10 2011 015318 A1 | 10/2012 |

(Continued)

OTHER PUBLICATIONS

International Search Report and Written Opinion of the International Searching Authority for related PCT application; dated Dec. 9, 2015.
(Continued)

*Primary Examiner* — Thaddeus J Plecha
(74) *Attorney, Agent, or Firm* — Black, McCuskey, Souers & Arbaugh, LPA

(57) ABSTRACT

A method for authorizing an action on a self-service system, in which a user is authorized, by using an authorization server, to carry out an action on a self-service system is provided. The user is equipped with a token for his/her identification.

16 Claims, 2 Drawing Sheets

(51) Int. Cl.
*G06Q 20/10* (2012.01)
*G06Q 20/32* (2012.01)
*G06Q 20/34* (2012.01)
*H04W 4/80* (2018.01)
*G06Q 20/18* (2012.01)
*H04B 5/00* (2006.01)

(52) U.S. Cl.
CPC ........... *G06Q 20/18* (2013.01); *G06Q 20/322* (2013.01); *G06Q 20/353* (2013.01); *H04L 63/0869* (2013.01); *H04L 63/0884* (2013.01); *H04L 63/18* (2013.01); *H04W 4/80* (2018.02); *H04B 5/0031* (2013.01)

(56) References Cited

U.S. PATENT DOCUMENTS

| | | | |
|---|---|---|---|
| 2004/0250066 A1* | 12/2004 | Di Luoffo | G06Q 20/341 713/168 |
| 2008/0046982 A1* | 2/2008 | Parkinson | H04L 9/0891 726/5 |
| 2009/0282258 A1* | 11/2009 | Burke | G06F 21/31 713/184 |
| 2011/0140841 A1 | 6/2011 | Bona et al. | |
| 2011/0231905 A1 | 9/2011 | Breuer | |
| 2011/0296194 A1* | 12/2011 | Herkes | G06F 21/34 713/185 |
| 2012/0233006 A1 | 9/2012 | St. George et al. | |
| 2013/0054474 A1* | 2/2013 | Yeager | G06Q 20/3223 705/71 |
| 2013/0179940 A1 | 7/2013 | Krummel | |
| 2014/0233006 A1 | 8/2014 | Xalter et al. | |
| 2015/0278537 A1* | 10/2015 | Lyall | G06F 21/6218 726/17 |

FOREIGN PATENT DOCUMENTS

| | | |
|---|---|---|
| EP | 2 602 738 A2 | 6/2013 |
| WO | 2010048350 A1 | 4/2010 |
| WO | 2012140249 A1 | 10/2012 |

OTHER PUBLICATIONS

Office Action filed in U.S. Appl. No. 15/510,514 dated Jun. 28, 2019; 13 pages.

\* cited by examiner

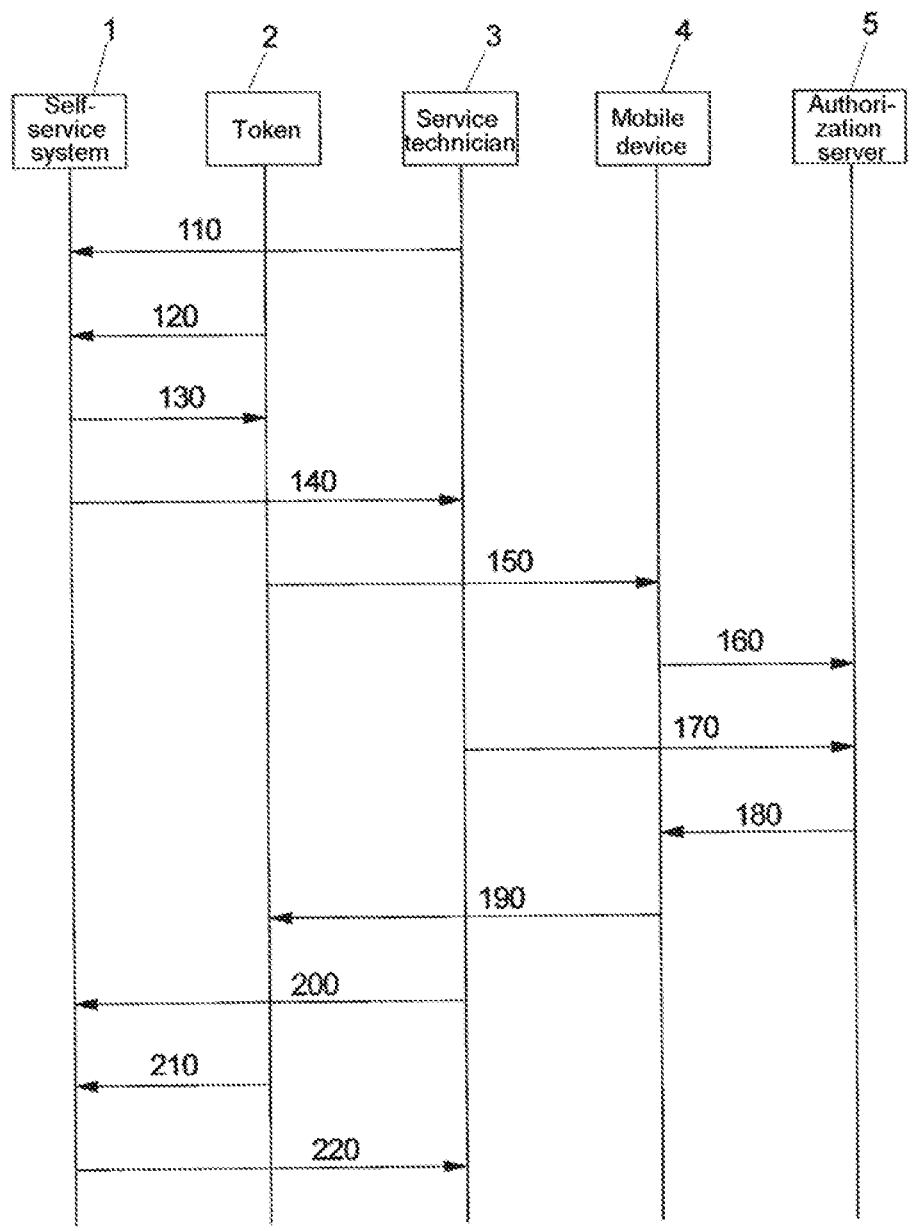

METHOD AND ARRANGEMENT FOR AUTHORIZING AN ACTION ON A SELF-SERVICE SYSTEM

CROSS-REFERENCE TO A RELATED APPLICATION

This application is a National Phase Patent Application of International Patent Application Number PCT/EP2015/070731, filed on Sep. 10, 2015, which claims priority of European Patent Application Number 14184752.5, filed on Sep. 15, 2014.

BACKGROUND

The invention relates to a method and an arrangement for authorizing an action on a self-service system.

Modern self-service systems—such as, for example, ATMs or other devices of banking automation—involve complex protective mechanisms to counter external attackers. For service operations by a service technician, however, it is necessary that these protective mechanisms be at least partially switched off. This is necessary, for example, when unforeseen software updates or hardware updates have to be performed by a service technician.

Since self-service systems are networked highly variably, it is customary to perform an offline authorization directly on the self-service system. For this purpose the service technician is given a technician token—that is to say, a hardware component for his/her identification—the rights of the service technician in respect of service operations having been stored on such a technician token. In the course of a technician operation, the self-service system checks these rights and reacts accordingly. The technician token is realized, for example, as a USB stick with built-in flash memory, which is inserted into the USB port of the system PC.

Such an offline authorization of a service technician, however, has its drawbacks. A first drawback consists in the fact that an authorization is only undertaken locally in relation to the self-service system. A reliable logging of service operations and hence a reliable traceability are therefore not possible. A second drawback consists in the fact that a withdrawal of rights is only possible to a limited extent. Accordingly, technician tokens conventionally have long time windows for the stored rights. A withdrawal of rights ultimately requires the collecting-in of the technician token, which may be associated with practical difficulties.

A further drawback consists in the fact that the proprietors of self-service systems frequently close the USB ports of such systems for external components, in order to prevent the transfer of harmful software via this route. In this case an offline authorization is not possible from the outset.

One drawback of an offline authorization consists, moreover, in the fact that in the case where a service technician is threatened directly there is no possible way to block the access of the service technician or to send an emergency signal unnoticed.

SUMMARY

An object underlying the present invention is to make available a method and an arrangement for authorizing an action, such as a transaction or a service operation, on a self-service system that enable an on-line authorization in reliable manner.

In accordance with the invention this object is achieved by a method with features as described herein and by an arrangement with features as described herein.

Accordingly, the method provides for authorizing a user, in particular a service technician, by means of an authorization server to the effect that the user is able to carry out an action, in particular a service operation, on a self-service system. For this purpose the user is equipped with a token. In this case it is a question of a hardware component, for example in the form of a chip card or smart card. User-specific data—such as, for example, name, company affiliation and cryptographic keys for authenticating and encrypting data—have been stored on the token. Access to the function of this token is secured with a password.

The method provides that a first message is generated by the self-service system when the user has identified himself/herself to the self-service system by means of the token. For this purpose the user inserts his/her personal token into, for example, a card reader of the self-service system. The self-service system stores the first message on the token, said first message containing data for identifying the user and data for identifying the self-service system. In addition, there may be provision that the first message is digitally signed by the self-service system, for example using a digital signature method known as such.

Afterwards the first message is transmitted from the token to the authorization server via at least one communication link. As will be explained below, this transmission may be undertaken by interposing a mobile radio device of the user. Subsequently a check is made at the authorization server, taking the first message into consideration, as to whether the action, in particular the service operation, by the user on the self-service system is permitted to be carried out. Thereupon a second message is generated at the authorization server, which contains data about whether the action by the user on the self-service system is permitted to be carried out. This second message is transmitted from the authorization server to the token, once again via at least one communication link. The second message received at the token is then read by the self-service system, for example by the user re-inserting the token into the card reader of the self-service system. If the second message contains a corresponding authorization, an approval of the user is given by the self-service system. In this case there may be provision that protective mechanisms of the self-service system against external attackers are at least partially deactivated by the self-service system for the purpose of carrying out the action.

The solution according to the invention therefore enables a remote authentication of a user by using a token and an authorization server. In particular, the solution according to the invention enables a remote authentication of a service technician by using a technician token and an authorization server. The authorization server is, for example, under the control of the respective service company or of the institution that is operating the self-service system. In the authorization server it can be checked at any time in timely manner whether a particular service technician has been authorized to carry out a particular service operation on a particular self-service system. The on-line authorization according to the invention avoids the drawbacks associated with an offline authorization. Alternatively, this method can also be used for authenticating a transaction.

One configuration of the invention provides that the token has two interfaces. A first interface serves for transmitting data between the token and the self-service system. A second interface serves for transmitting data between the token and a further device which is, for example, the mobile radio device of the user. The generating of the first message by the self-service system comprises the steps of inserting the token into a token reader of the self-service system, reading identification data of the token via the first interface of the token, and transmitting the first message from the self-service system to the token via the first interface.

A further configuration of the invention provides that the transmitting of the first message from the token to the authorization server comprises the following steps. The first message is transmitted from the token to a mobile radio device of the user in a first step. This is undertaken, for example, via the aforementioned second interface of the token. The mobile radio device of the user is provided with a corresponding communication interface, so that it can receive the first message from the token. For example, the second interface of the token takes the form of an NFC interface, so that the first message is transmitted to the mobile radio device by means of NFC technology, in which connection an NFC interface has likewise been implemented in the mobile radio device. In a second step, the first message is transmitted from the mobile radio device to the authorization server. For this purpose the mobile radio device establishes a communication link to the authorization server, via which the first message can be transmitted. Such a communication link may be made in conventional manner, for example via a radio network and the Internet and/or a fixed network.

In this case there may be provision that the mobile radio device of the user or service technician takes the form of a smartphone and contains an application (app) that controls the establishing of a communication link between the mobile radio device and the authorization server and the transmitting of the first message to the authorization server.

A further configuration of the invention provides that prior to the generation of the second message at the authorization server the mobile radio device and the authorization server and/or the token and the authorization server carry out a mutual authentication. Such an authentication comprises the input by the user on the mobile radio device and/or on the self-service system of a password assigned to the token. By virtue of the fact that the user has to enter the password on the mobile radio device and accordingly has to know it, an unauthorized person who has the token for some reason is prevented from being able to obtain an authentication.

A further configuration of the invention provides that the second message is cryptographically protected by the authorization server, in particular in order to prevent a protection in relation to manipulations and a possible re-importing. "Re-importing" in this connection means that an attacker transfers valid messages from old protocol routines into other protocol routines, for example in order to re-use an old valid permission without permission. For example, an attacker might try to use a correctly signed message pertaining to a technician operation from the previous day to gain rights to a self-service system. Since the signature of the service technician is still valid, special measures have to be taken here. By a cryptographic protection of the second message, a protection against such a re-importing is made available, since a new, current cryptographic process takes place.

In accordance with one configuration the second message is transmitted from the authorization server to the token in such a manner that a transmission to the mobile radio device of the user firstly takes place. Subsequently the transmission from the mobile radio device of the user to the token takes place, once again via the already mentioned second interface of the token.

A further configuration of the invention provides that the token contains an emergency password in addition to a regular password, and in the case of the communication of said emergency password to the authorization server by the user the authorization server performs or brings about at least one additional measure. Such an additional measure is, for example, the notification of the police or the activation of an extended monitoring procedure in order to be better able to identify a potential offender. So, for example, if the user, in particular a service technician, is threatened by an offender, he/she can enter the emergency password instead of the regular password when the authorization server and the mobile radio device or the token are carrying out a mutual authentication. This cannot be discerned by the offender, since he/she does not know either of the two passwords.

In this connection there may be provision in one configuration that the emergency password constitutes a variant of the original password. For this purpose there may, for example, be provision that the emergency password is formed from the original password by a simple transformation rule. Such a transformation rule is, for example, the addition or subtraction of a certain number such as, for example, the number 1, or the appending of one or more characters. The advantage in the use of a variant of the original password consists in the fact that it can be more easily ensured thereby that the rarely used emergency password also occurs to the user or service technician in an emergency.

A further configuration of the invention provides that the authorization server checks whether there are indications of an improper use of the method. In this case the authorization server sends a deactivation message to the token, whereupon the token permanently deactivates itself. An indication of an improper use consists, for example, in the reception of an emergency password according to the exemplary embodiment just elucidated. The authorization server is consequently capable of sending a deactivation message to the token if necessary. After the token has deactivated itself, it cannot be employed for further technician authentications.

The present invention also relates to an arrangement for authorizing an action on a self-service system. The arrangement comprises a self-service system, a token of the user, in particular of a service technician, and an authorization server. The arrangement comprises the following features:

the self-service system has been set up to generate a first message when the user has identified himself/herself to the self-service system by means of the token, and to store the first message on the token, said first message containing data for identifying the user and the self-service system, the token has been set up to transmit the first message via a communication link, the authorization server has been set up to receive the first message via a communication link, the authorization server has further been set up to check, taking the first message into consideration, whether the action by the user on the self-service system is permitted to be carried out, the authorization server has further been set up to generate a second message and to transmit the second message via a communication link, said second message containing data about whether the action by the user on the self-service system is permitted to be carried out, and the self-service system has further been set up to read the second message and to allow an action if the second message contains a corresponding authorization.

According to one configuration, the arrangement includes, moreover, a mobile radio device, said token having been set up to transmit the first message to the mobile radio device of the user, said mobile radio device having been set up to transmit the first message to the authorization server, said authorization server having been set up to transmit the second message to the mobile radio device of the user, and said mobile radio device further having been set up to transmit the second message to the token.

BRIEF DESCRIPTION OF THE DRAWINGS

The invention will be elucidated in more detail in the following with reference to the figures of the drawing on the basis of several exemplary embodiments:

FIG. 2 shows an exemplary embodiment of a method sequence for remotely authenticated maintenance of a self-service system.

DETAILED DESCRIPTION

Figure 1:
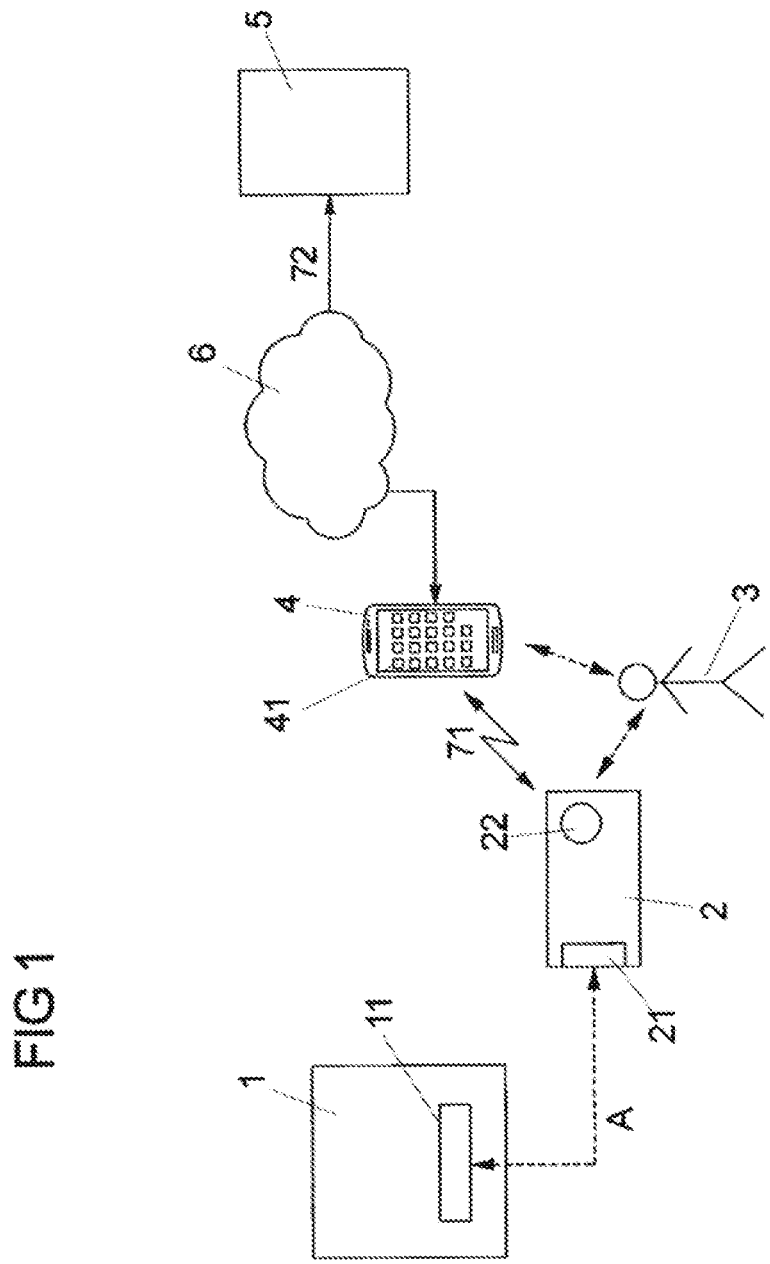
FIG. 1 shows schematically, an arrangement for authorizing a service operation on a self-service system, said arrangement comprising a self-service system, a token, a mobile radio device and an authorization server.

FIG. 1 shows an exemplary embodiment of an arrangement for authorizing a service operation on a self-service system. The arrangement comprises a self-service system 1, a token 2, a mobile radio device 4 of a service technician 3, and an authorization server 5.

The self-service system 1 may, in principle, be an arbitrary self-service system that finds application in banking automation and service automation. For example, it may be a question of an ATM, a bank-statement printer, an automated machine for access control, or an automated machine employed in postal and logistical solutions.

In the exemplary embodiment represented, the token 2 takes the form of a chip card. Alternatively, the token 2 may also have been realized by a different hardware component such as, for example, a USB stick. In principle, it is also possible to design the token 2 as a software token and, for example, in this case to integrate it into the mobile radio device 4.

The token 2 comprises two interfaces: a first interface 21 for communicating with the self-service system 1, and a second interface 22 for communicating with the mobile radio device 4. For the purpose of transferring data between the self-service system 1 and the token 2, the token 2 is inserted into a card reader 11 of the self-service system 1 (cf. arrow A of FIG. 1), data being transferred via interface 21. Alternatively, the interface may also take the form of a short-range radio interface.

The second interface 22 of the token 2 may take the form of a radio interface. This may take the form of a short-range radio interface. It is realized, for example, by an NFC interface (NFC=Near Field Communication). The token 2 which is provided with two interfaces 21, 22 may also be designated as a "dual-interface token" (DIT). Alternatively, use may also be made of a different technology for the short-range radio interface, such as, for example, WLAN, Bluetooth, Bluetooth Low Energy, Bluetooth Low Energy iBeacon Technology, RFID and/or ZigBee. In another embodiment, the second interface takes the form of a contact connection or wire-bound interface.

In an alternative embodiment, the token 2 may be a component of the mobile radio device 4. In particular, a secure area may have been implemented in the mobile radio device 4 in the form of a special modular unit. In this example the first interface has been configured as a short-range radio interface and consequently enables access from and to the self-service system 1. The second interface then takes the form of an internal wire-bound interface in the mobile radio device 4 and is used for the communication with the other modules in the mobile radio device 4.

The mobile radio device 4 serves for communication, on the one hand, with the token 2 and, on the other hand, with the authorization server 5. Accordingly, in addition to a conventional mobile-radio interface the mobile radio device 4 additionally has an interface for communicating with the token 2 via interface 22 thereof. If interface 22 takes the form of an NFC interface, the mobile radio device 4 accordingly likewise possesses an NFC interface, so that a communication link 71 can be set up. Alternatively, the mobile radio device 4 supports one or more of the alternative technologies.

The mobile radio device 4 can, moreover, set up a communication link 72 to the application server 5. This is undertaken in conventional manner via a mobile radio network 6 and, where appropriate, further networks such as, for example, the Internet and/or a fixed telecommunications network. The connection from the mobile radio device 4 to the application server 5 can also be made, for example, via a local radio network (WLAN) and further networks connected thereto.

The mobile radio device 4 takes the form of a smartphone, for example, and has a plurality of software applications in this case. There is provision that one of these software applications 41 has been set up to control the establishing of a communication link 72 between the mobile radio device 4 and the authorization server 5 as well as the transmission of messages between the mobile radio device 4 and the authorization server 5.

Both the token 2 and the mobile radio device 4 have been assigned to the service technician 3. Accordingly, the token 2 includes technician-specific data such as, for example, name and company affiliation of the service technician and also, where appropriate, cryptographic keys for authenticating and encrypting data. Access to the functions of the token 2 is secured by a password that the service technician 3 knows. The mobile radio device 4 has likewise been assigned to the service technician, so that the latter can identify himself/herself to the mobile radio device 4 with a PIN.

The authorization server 5 possesses information as regards a plurality of self-service systems and service technicians. For example, information comes together at the authorization server 5 as to which self-service systems have which protective mechanisms against an unauthorized access and which of these protective mechanisms are to be deactivated in the case of a service operation by a service technician. Furthermore, information comes together at the authorization server as to which service technicians are permitted to carry out which service operations on which self-service systems. The authorization server 5 contains, moreover, cryptographic keys for authenticating and encrypting data, as well as the passwords of the issued tokens 2.

In particular, there may be provision that the authorization server 5 has stored the following information about the self-service systems and the service technicians or their tokens, in order that an authentication can be undertaken and/or status information can be tracked:

information relating to the unambiguous identification of a service technician, in particular name, department, staff number, etc.;

information relating to the current status and to the granted rights, for example about rights of the service technician to maintain certain classes of device or specific devices;

information about the level of training of a service technician, from which it follows, for example, whether a service technician can, in principle, execute a planned service measure;

information about current maintenance contracts;

information about the status of the service technician, for example about whether the service technician is active, has been blocked (where appropriate, up until a certain date), has left the company, etc.;

information about the token of the technician, in particular serial number and status information. The status information indicates, for example, whether a token has been reported as stolen or lost, whether a token was misused in an attack, etc.; and information that is used for authenticating, such as, for example, certificate(s).

An exemplary embodiment of a method sequence for authorizing a service operation on a self-service system will be elucidated in the following on the basis of FIG. 2.

In a first step 110, the service technician 3 inserts his/her personal token 2, the password of which he/she knows, into the card reader 11 (cf. FIG. 1) of the self-service system 1. By means of the token 2, the service technician authenticates himself/herself to the self-service system 1. This authentication involves the input of a password of the token 2—that is to say, a PIN input—being undertaken by the service technician. In this connection it may be a question of the regular password of the token 2 or, in a practical variant, alternatively an emergency password that will be considered in more detail below. The token 2 then decides whether: a) the further protocol will be terminated, since the PIN input was incorrect; b) the further protocol will continue normally, since the PIN input was correct; or c) the emergency mode will be activated, since an emergency PIN was entered.

In the course of the authentication of the service technician to the self-service system 1, the self-service system reads out at least data for identifying the service technician 3, cf. step 120, this communication being initiated by a message from the self-service system to the token 2. In this process a mutual identification and authentication of the self-service system 1 and of the token 2 takes place, so that both sides know that they are talking to trustworthy entities. For example, the communication between the self-service system 1 and the token 2 is effected by a bidirectional challenge-response connection.

Subsequently the self-service system 1 generates, in step 130, a first message which comprises the acquired data for identifying the service technician 3 and additionally data for identifying the self-service system 1. This first message is transmitted in step 130 to the token 2 and stored therein. The corresponding communication is undertaken via the first interface 21 of the token 2 (cf. FIG. 1).

There may be provision, furthermore, that the self-service system 1 digitally signs the first message. Such a digital signature can be effected by using a digital signature method, for example with the aid of a secret signature key which has been stored on the self-service system 1. The first message may contain further information, for example a time-stamp, position information and/or a current photographic recording of the space in which the self-service system 1 is located. Positional information permits, for example, a comparison of the position of the self-service system with the GPS position of the mobile radio device of the mobile technician. If these two positions do not tally, this constitutes an indication of a misuse.

Subsequently the service technician 3 withdraws the token 2 from the self-service system 1 in step 140. With the aid of his/her mobile radio device 4 he/she now establishes a connection between the token 2 and the authorization server 5. This is done in two steps. In a first step 150, a communication link is established between the token 2 and the mobile radio device 4. This is undertaken via interface 22 of the token 2 and a corresponding interface in the mobile radio device 4. In the case of an NFC interface, the service technician 3 holds the token 2 against the mobile radio device 3, so that the first message can be transmitted to the mobile radio device 3.

In a second step 160, the mobile radio device 4 sets up a communication link with the authorization server 5. This is undertaken, for example, via the application 41, mentioned with respect to FIG. 1, on the mobile radio device 4. After the connection has been set up, the first message is transmitted to the authorization server 5. Before and/or after the first message has been transmitted, the token 2 and the authorization server 5 carry out a mutual authentication. Such an authentication can be undertaken via an authentication protocol, for example the Challenge-Handshake Authentication Protocol (CHAP). The mutual authentication is undertaken via the two communication links 71, 72 (cf. FIG. 1) and interposition of the mobile radio device 4. In this case there may be provision that the mobile radio device 4 also provides authentication information to the authorization server 5.

Within the framework of the mutual authentication there is provision that the service technician 3 has to perform, in a step 170, the input of the password of the token 2 on the mobile radio device 4. For this purpose a corresponding request of the authorization server 5 is issued, for example, to the mobile radio device 4, which the application 41 displays. This measure provides additional security, insofar as an unauthorized person who is in possession of the token 2 is prevented from being authenticated. The password of the token 2 would not be known to such an unauthorized person. Alternatively, the application 41 may have been configured in such a way that a corresponding request is generated directly, without the authorization server 5 requesting this.

The authorization server 5 now checks, on the basis of the first message and the information stored or available in the authorization server, whether the technician operation on the self-service system 1 by the service technician 3 is permitted to be carried out. For this purpose said server generates a second message which is transmitted to the mobile radio device 4 in step 180 via communication link 72. The second message is then transmitted in step 190 from the mobile radio device 4 to the token 2 via communication link 71. In this case there may be provision that the second message is cryptographically protected in the authorization server 5 against manipulation and re-importing.

In step 200 the service technician re-inserts the token 2, which now contains the second message of the authorization server 5, into the card reader 11 of the self-service system. The self-service system 1 consequently has access to the second message of the authorization server 5 and can read out said message via interface 21, step 210. Now if the authorization server 5 has authorized the access, the service operation is allowed. For this purpose there is provision, for example, that certain or all protective mechanisms that protect the self-service system 1 in the normal case against external attacks and manipulations are deactivated. The deactivating of these protective mechanisms occurs only for the duration of the service operation. If the authorization server 5 has not allowed the service operation, the service operation is denied.

Finally, the service technician 3 takes the token 2 out of the self-service system, step 220.

The described method sequence can be extended, in order to counter emergency situations such as a personal threat to a service technician by an offender who wishes to obtain unwarranted access to the self-service system 1. For this purpose, one configuration of the described method provides that a so-called emergency password in addition to a regular password is assigned to each token 2. The service technician 3 knows both passwords. This emergency password is accepted in the protocol routine as the correct password, but signals the emergency of the technician to the authorization server 5. In particular, if the service technician enters the emergency password instead of the regular password in step 170 of FIG. 2, an emergency is signaled to the authorization server 5 by this means. The input of the emergency password can also be undertaken, for example, when the service technician is authenticating himself/herself to the self-service system 1 by a PIN input, cf. steps 110, 120 of FIG. 2. The authorization server 5 can now perform or bring about certain measures, for example notify the police or activate an extended monitoring procedure in the space in which the self-service system 1 has been installed, so that the offender can be identified more easily.

As a further security measure there may be provision that the authorization server 5 is capable of sending a deactivation message to the token 2. Such a deactivation message is emitted if indications of an emergency or of an improper use of the token 2 are available to the authorization server 5. Such an emergency is indicated, for example, by the aforementioned emergency password. After reception of the deactivation message at the token 2, the latter checks the message and deactivates itself, where appropriate permanently. For an outsider in this case it is not possible to tell whether it is a question of a regular message of the authorization server 5 or a deactivation message. Alternatively there may be provision that after reception of the deactivation message at the token 2 this message modifies the token 2 in such a manner that when the token 2 is being introduced into the card reader 11 this token is identified as an "improperly used token" and is confiscated by the self-service system 1 or permanently deactivated by the card reader.

The invention is not restricted in its configuration to the exemplary embodiments described above. For example, there may be provision that a communication between the token 2 and the mobile radio device 4 is undertaken in a manner other than via a radio interface; for example, the token 2 is also capable of being inserted via a card reader on the mobile radio device 4. In this case the token 2 only has to be equipped with one interface.

What is claimed is:

1. A method for authorizing an action on a self-service system, in which a user is authorized, by using an authorization server, to carry out the action on the self-service system, wherein the user is equipped with a token for his/her identification, and wherein the method comprises:

generation of a first message by the self-service system when the user has identified himself/herself to the self-service system by means of the token, and storage of the first message on the token, said first message containing data for identifying the user and the self-service system, transmission of the first message from the token to the authorization sever, checking at the authorization server, taking the first message into consideration, whether the action by the user on the self-service system is permitted to be carried out, generation of a second message at the authorization server and transmission of the second message from the authorization server to the token, said second message containing data about whether the action by the user on the self-service system is permitted to be carried out, reading of the second message by the self-service system and allowing the action by the self-service system if the second message contains a corresponding authorization;

wherein the authorization server checks whether there are indications of an improper use of the method, in which case the authorization server sends a deactivation message to the token, whereupon the token is permanently deactivated.

2. The method as claimed in claim 1, wherein the generating of the first message by the self-service system comprises the following steps:

inserting the token into a token reader of the self-service system;

reading identification data of the token via a first interface of the token, and transmitting the first message from the self-service system to the token via the first interface.

3. The method as claimed in claim 1, wherein the first message is digitally signed by the self-service system.

4. The method as claimed in claim 1, wherein the transmitting of the first message from the token to the authorization server comprises the following steps:

transmitting the first message from the token to a mobile radio device of the user, and transmitting the first message from the mobile radio device to the authorization server.

5. The method as claimed in claim 4, wherein the transmitting of the first message from the token to the mobile radio device of the user is undertaken via a second interface of the token.

6. The method as claimed in claim 5, wherein the second interface of the token is an NFC interface and the first message is transmitted to the mobile radio device via NFC technology.

7. The method as claimed in claim 1, wherein prior to generation of the second message at the authorization server the mobile radio device and the authorization server and/or the token and the authorization server carry out a mutual authentication which comprises input of a password assigned to the token on the mobile radio device and/or on the self-service system.

8. The method as claimed in claim 1, wherein the second message is cryptographically protected by the authorization server.

9. The method as claimed in claim 4, wherein the transmitting of the second message from the authorization server to the token comprises the following steps:

transmitting the second message from the authorization server to the mobile radio device of the user, and transmitting the second message from the mobile radio device of the user to the token.

10. The method as claimed in claim 1, wherein the reading of the second message by the self-service system involves insertion of the token provided with the second message into a token reader of the self-service system.

11. The method as claimed in claim 1, wherein the token contains an emergency password in addition to a regular password, and in case of communication of said emergency password to the authorization server by the user the authorization server performs or brings about at least one additional measure.

12. The method as claimed in claim 1, wherein the user is a service technician and the action is a service operation.

13. An arrangement for authorizing an action on a self-service system, said arrangement comprising a self-service system, a hardware token of a user and an authorization server, and wherein the self-service system has been set up to generate a first message when the user has identified himself/herself to the self-service system by means of the token, and to store the first message on the token, said first message containing data for identifying the user and the self-service system, the token has been set up to transmit the first message via a communication link, the authorization server has been set up to receive the first message via a communication link, the authorization server has further been set up to check, taking the first message into consideration, whether the action by the user on the self-service system is permitted to be carried out, the authorization server has further been set up to generate a second message and to transmit the second message via a communication link, said second message containing data about whether the action by the user on the self-service system is permitted to be carried out, and the self-service system has further been set up to read the second message and to allow the action if the second message contains a corresponding authorization, wherein the authorization server has further been set up to check whether there are indications of an improper use of the arrangement, in which case the authorization server sends a deactivation message to the token, whereupon the token is permanently deactivated.

14. The arrangement as claimed in claim 13, wherein the token has two interfaces: a first interface for transferring data between the token and the self-service system, and a second interface for transferring data between the token and a further device.

15. The arrangement as claimed in claim 13, wherein the arrangement includes, moreover, a mobile radio device of the user, wherein the token has been set up to transmit the first message to the mobile radio device, the mobile radio device has been set up to transmit the first message to the authorization server, the authorization server has been set up to transmit the second message to the mobile radio device, and the mobile radio device has further been set up to transmit the second message to the token.

16. The arrangement as claimed in claim 13, wherein the user is a service technician and the action constitutes a service operation.

* * * * *